US008627888B2

(12) United States Patent
Santra et al.

(10) Patent No.: US 8,627,888 B2
(45) Date of Patent: Jan. 14, 2014

(54) SETTABLE COMPOSITIONS CONTAINING METAKAOLIN HAVING REDUCED PORTLAND CEMENT CONTENT (75) Inventors: Ashok K. Santra, Norman, OK (US); Krishna M. Ravi, Kingwood, TX (US); Crystal Lynne Keys, Lawton, OK (US); Benjamin Iverson, Duncan, OK (US); Rahul Patil, Pune (IN); Sandip Patil, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 259 days.

(21) Appl. No.: 13/107,055

(22) Filed: May 13, 2011

(65) Prior Publication Data
US 2012/0285682 A1 Nov. 15, 2012

(51) Int. Cl.
*E21B 33/13* (2006.01)

(52) U.S. Cl.
USPC .............................. 166/293; 175/72; 106/710

(58) Field of Classification Search
None
See application file for complete search history.

(56) References Cited

U.S. PATENT DOCUMENTS

| 6,145,591 | A | 11/2000 | Boncan et al. |
|---|---|---|---|
| 6,230,804 | B1 | 5/2001 | Mueller et al. |
| 6,626,243 | B1 | 9/2003 | Go Boncan |
| 7,077,203 | B1 | 7/2006 | Roddy et al. |
| 7,174,962 | B1 | 2/2007 | Roddy et al. |
| 7,182,137 | B2 | 2/2007 | Fyten et al. |
| 7,204,307 | B2 | 4/2007 | Roddy et al. |
| 7,303,015 | B2 | 12/2007 | Fyten et al. |
| 7,326,291 | B2 | 2/2008 | Fyten et al. |
| 7,332,026 | B2 | 2/2008 | Fyten et al. |
| 7,335,252 | B2 | 2/2008 | Roddy et al. |
| 7,353,870 | B2 | 4/2008 | Roddy et al. |
| 7,387,675 | B2 | 6/2008 | Roddy et al. |
| 7,395,860 | B2 | 7/2008 | Roddy et al. |
| 7,445,669 | B2 | 11/2008 | Roddy et al. |
| 7,478,675 | B2 | 1/2009 | Roddy et al. |
| 7,607,482 | B2 | 10/2009 | Roddy et al. |
| 7,607,484 | B2 | 10/2009 | Roddy et al. |
| 7,631,692 | B2 | 12/2009 | Roddy et al. |
| 7,674,332 | B2 | 3/2010 | Roddy et al. |
| 7,743,828 | B2 | 6/2010 | Roddy et al. |
| 7,784,542 | B2 | 8/2010 | Roddy et al. |
| 7,789,150 | B2 | 9/2010 | Roddy et al. |
| 7,806,183 | B2 | 10/2010 | Roddy et al. |

(Continued)

FOREIGN PATENT DOCUMENTS

| CA | 2 316 059 A1 | 2/2001 |
|---|---|---|
| GB | 2 385 326 A | 8/2003 |

(Continued)

OTHER PUBLICATIONS

International Search Report and Written Opinion for PCT/GB2012/000430 dated Oct. 19, 2012.

(Continued)

*Primary Examiner* — Zakiya W Bates
(74) *Attorney, Agent, or Firm* — Craig W. Roddy; McDermott Will & Emery LLP (57) ABSTRACT

Of the many compositions and methods provided herein, one method includes providing a settable fluid that comprises an aqueous-based medium, a lime composition, and a cementitious blend that comprises metakaolin particulates and aluminosilicate particulates, wherein the cementitious blend is essentially free of Portland cement; introducing the settable fluid into a wellbore penetrating a subterranean formation that comprises a corrosive component; and allowing the settable fluid to set therein.

20 Claims, 2 Drawing Sheets

(56) References Cited

U.S. PATENT DOCUMENTS

| | | |
|---|---|---|
| 7,810,566 B2 | 10/2010 | Caveny et al. |
| 7,846,250 B2 | 12/2010 | Barlet-Gouedard et al. |
| 7,927,419 B2 | 4/2011 | Roddy et al. |
| 2005/0160945 A1 | 7/2005 | Barlet-Gouedard et al. |
| 2007/0056474 A1 | 3/2007 | Roddy et al. |
| 2007/0056475 A1 | 3/2007 | Roddy et al. |
| 2007/0056476 A1 | 3/2007 | Roddy et al. |
| 2007/0056728 A1 | 3/2007 | Roddy et al. |
| 2007/0056733 A1 | 3/2007 | Roddy et al. |
| 2007/0056734 A1 | 3/2007 | Roddy et al. |
| 2008/0000641 A1 | 1/2008 | Caveny et al. |
| 2008/0028994 A1 | 2/2008 | Barlet-Gouedard et al. |
| 2008/0066654 A1 | 3/2008 | Fraser |
| 2008/0066655 A1 | 3/2008 | Fraser |
| 2009/0088348 A1 | 4/2009 | Roddy et al. |
| 2009/0126930 A1 | 5/2009 | Barlet-Gouedard et al. |
| 2009/0200029 A1 | 8/2009 | Roddy et al. |
| 2009/0236097 A1 | 9/2009 | Roddy et al. |
| 2009/0312445 A1 | 12/2009 | Roddy et al. |
| 2009/0320720 A1 | 12/2009 | Roddy et al. |
| 2010/0025039 A1 | 2/2010 | Roddy et al. |
| 2010/0041792 A1 | 2/2010 | Roddy et al. |
| 2010/0044043 A1 | 2/2010 | Roddy et al. |
| 2010/0095871 A1 | 4/2010 | Patil et al. |
| 2010/0096135 A1 | 4/2010 | Roddy et al. |
| 2010/0212892 A1 | 8/2010 | Santra et al. |
| 2010/0258312 A1 | 10/2010 | Brenneis et al. |
| 2010/0273912 A1 | 10/2010 | Roddy et al. |
| 2010/0282466 A1 | 11/2010 | Brenneis et al. |
| 2010/0292365 A1 | 11/2010 | Roddy et al. |
| 2010/0294496 A1 | 11/2010 | Woytowich et al. |
| 2011/0000400 A1 | 1/2011 | Roddy |
| 2011/0048709 A1 | 3/2011 | Patil et al. |

FOREIGN PATENT DOCUMENTS

| | | |
|---|---|---|
| GB | 2 387 613 A | 10/2003 |
| WO | WO 2007/048999 A1 | 5/2007 |
| WO | WO2010/135522 A1 | 11/2010 |

OTHER PUBLICATIONS

Mahmoudkhani et al., "New Environment-Friendly Cement Slurries with Enhanced Mechanical Properties," CIPC/SPE Gas Technology Symposium 2008 Joint Conference held in Calgary, Alberta, Canada, Jun. 16-19, 2008.

Suyan et al., "Novel Cement Composition for Completion of Thermal Recovery (ISC) Wellbores," SPE/IADC 101848, 2006.

Banerjee, et al., "Engineered Kick-Off Plugs to Reduce Unproductive Downtime in Sidetracking Operation," SPE/IADC 125727, 2009.

Halliburton Brochure, "Microbond HT™ Cement Additive," 2007.

Halliburton Brochure, "HR®-4 Cement Retarder," 2010.

Halliburton Brochure, "HR®-5 Cement Additives," 2007.

Halliburton Brochure, "HR®-7 Cement Retarder," 2007.

Halliburton Brochure, "HR®-15 Cement Retarder," 2007.

Halliburton Brochure, "HR®-601 Cement Retarder," 2008.

Halliburton Brochure, "SCR-100™ Cement Retarder," 2010.

Halliburton Brochure, "SCR-500L™ High-Temperature Retarder," 2007.

Halliburton Brochure, "CFR-3™ and CFR-3L™ Dispersant," 2012.

Halliburton Brochure, "D-Air 3000™ and D-Air 3000L™ Defoamer," 2012.

Halliburton Brochure, "VersaSet Thixotropic Additive," 2007.

SETTABLE COMPOSITIONS CONTAINING METAKAOLIN HAVING REDUCED PORTLAND CEMENT CONTENT

BACKGROUND

The present invention relates to cementing operations, and more specifically, to cementing operations in subterranean formations that contain corrosive components.

Hydraulic cement compositions are commonly used in subterranean operations, particularly completion and remedial operations. For example, hydraulic cement compositions may be used in primary cementing operations whereby pipe strings, such as casings and liners, are cemented in wellbores. Hydraulic cement compositions may also be used in remedial cementing operations such as plugging highly permeable zones or fractures in wellbores, plugging cracks and holes in pipe strings, and the like.

A variety of hydraulic cement compositions have been used in conventional subterranean cementing operations with the most common cement compositions comprising Portland cement. However, Portland cement has drawbacks in its method of preparation, methods of implementation, and final set compositions. Portland cement is generally prepared by heating a mixture of raw materials comprising calcium oxide, silicon oxide, aluminum oxide, ferric oxide, and magnesium oxide in a kiln to approximately 1500° C. Thus, the energy requirements to produce Portland cement are quite high, and heat loss during production can further cause actual energy requirements to be even greater. In addition, Portland cement manufacturing process produces about 5% of the total global anthropogenic $CO_2$. This makes for an expensive production method with a high carbon footprint. The manufacturing process of Portland cements also has batch-to-batch variations that may yield unpredictable results when applied in a wellbore.

In addition to manufacturing drawbacks, the implementation of Portland cements in subterranean formations also has drawbacks. Salts, particularly multivalent salts, often cause issues during the pumping and installation of a Portland cement. For example, when exposed to magnesium or calcium salts, Portland cement slurries are known to rapidly viscosify to a point that the cement is no longer pumpable. In subterranean formations, magnesium and calcium salts may be encountered in brines, evaporite minerals, and salt domes. To mitigate this effect, engineers may add scale inhibitors, chelating agents, or other additives to a treatment fluid containing Portland cement. However, this method is typically restricted because of very high material and installation costs.

Further, once the Portland cements are set within a wellbore, corrosive components, like salts, carbonic acid, and hydrogen sulfide, found within some subterranean formations may cause failure of Portland cement structure. As used herein, the term "corrosive" refers to a substance that destroys or irreversibly damages another surface or substance with which it comes into contact. For example, loss of metal due to chemical or electrochemical reactions is a commonly known form of corrosion. Corrosion rates may vary depending on the time, temperature, corrosive component, pH, and other physical and chemical variable. For example as shown in the chemical reaction below, dissolved carbon dioxide and carbonic acid can attack Portland cements by converting calcium hydroxide to the more stable calcium carbonate and/or calcium bicarbonate. First, dissolved carbon dioxide converts to carbonic acid thereby lowering the local pH. The rate of conversion may depend on temperature, partial pressure of carbon dioxide, and salt concentration. Second, carbonation of the Portland cement occurs which may cause (a) densification leading to increased hardness and reduced permeability thereby decreasing $CO_2$ diffusion and (b) volume expansion of up to 6%, which may lead to development of micro to macro cracks in extreme cases. Both of these results may be due to an increase in mass (from chemical consumption of $CO_2$) within the volume defined by the solid set cement matrix. Finally, the long-term phenomenon of dissolution of $CaCO_3$ may occur when the cement is surrounded by water containing dissolved $CO_2$ for extended periods of time. Dissolution of $CaCO_3$ may increase porosity and/or permeability thereby decreasing overall mechanical strength. Decreased cement integrity may lead to inefficient zonal isolation and in extreme cases complete failure of the cement composition.

1) Formation of carbonic acid:

$$CO_2 + H_2O \rightarrow H_2CO_3$$

2) Carbonation of Portlandite and/or cement hydrates:

$$Ca(OH)_2 + H_2CO_3 \rightarrow CaCO_3 + 2H_2O$$

$$C\text{—}S\text{—}H \text{ and/or crystalline phases} + H_2CO_3 \rightarrow SiO_2 \text{(gel)} + CaCO_3 + H_2O$$

3) Dissolution of $CaCO_3$ (long-term effect):

$$CaCO_3 + H_2CO_3 \rightarrow Ca(HCO_3)_2$$

Carbon dioxide and/or carbonic acid corrosion may, through the above mechanisms, lead to decreased strength of a Portland cement composition ultimately causing cracking and failure of a subterranean cement structure. This corrosion may be of greater concern depending on the characteristics of the subterranean cement structure. For example, increased surface area and/or increased permeability of the cement structure to water, as may be the case in a foamed cement structure, may dramatically increase the rate at which the structure corrodes causing a shorter usable life.

By a similar mechanism, sulfuric acid may cause Portland cement corrosion. Sulfuric acid corrosion may be magnified if the wellbore contains sulfate salts and/or bacteria that metabolize hydrogen sulfide and/or sulfur to sulfuric acid.

Additionally, hydrogen sulfide may cause significant Portland cement deterioration. Hydrogen sulfide in the presence of water converts to $HS^-$ and/or $S^{2-}$ that reacts with the calcium hydroxide and transition metal oxide containing components in Portland cement to form calcium sulfide and transition metal sulfide. For example, iron containing components, such as calcium ferroaluminate ($C_4AF$) (generally present from 8-13% Portland cement), may react with hydrogen sulfide by the reaction:

$$C_4AF \text{ or } Fe_xO_y + H_2S \rightarrow FeS_2 + H_2\text{(gas)}$$

To mitigate the corrosive damage, engineers use other cementitious compositions to replace at least some of the Portland cement in subterranean operations. This can be effective for formation with moderate corrosive capacity. However, it would be advantageous to have a cementitious composition essentially free of Portland cement for use in subterranean formations with high corrosive capacity or compounding corrosive components.

SUMMARY OF THE INVENTION

The present invention relates to cementing operations, and more specifically, to cementing operations in subterranean formations that contain corrosive components.

In one embodiment, the present invention provides a method comprising: providing a settable fluid that comprises an aqueous-based medium, a lime composition, and a cementitious blend that comprises metakaolin particulates and aluminosilicate particulates, wherein the cementitious blend is essentially free of Portland cement; introducing the settable fluid into a wellbore penetrating a subterranean formation that comprises a corrosive component; and allowing the settable fluid to set therein.

In one embodiment, the present invention provides a method comprising: providing a drilling fluid that comprises an aqueous-based medium, a lime composition, a set retarder, and a cementitious blend that comprises metakaolin particulates and aluminosilicate particulates, wherein the drilling fluid is essentially free of Portland cement, and wherein the set retarder is present at about 2% to about 10% by weight of settable blend; and drilling at least a portion of a wellbore penetrating a subterranean formation with the drilling fluid.

In one embodiment, the present invention provides a settable fluid comprising: an aqueous-based medium; a settable blend comprising metakaolin particulates at a concentration of about 5% to about 85% by weight of the settable blend and a fly ash at a concentration of about 15% to about 95% by weight of the settable blend; and a lime composition at a concentration of about 5% to about 25% by weight of the settable blend, wherein the settable fluid does not include a Portland cement.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

The present invention relates to cementing operations, and more specifically, to cementing operations in subterranean formations that contain corrosive components.

Of the many advantages of the present invention, the present invention provides cementitious blends and settable fluids that are essentially Portland cement free. The cementitious blends and settable fluids may be suitable for subterranean uses where Portland cement compositions fall short. More specifically the cementitious blends and settable fluids may be used in conjunction with brine-base treatment fluids, which may be incompatible with Portland cement, and in subterranean formations with corrosive components like salts, carbonic acid, and hydrogen sulfide that corrode set Portland cement compositions. The cementitious blends of the present invention include metakaolin. In addition to the compatibility with brines and corrosive subterranean formations, metakaolin production methods are less energy intensive than Portland cement production methods, thereby decreasing the cost and carbon footprint of cementing operations. Additionally, metakaolin production has less batch-to-batch variability than Portland cement, which may reduce unpredictable or inconsistent results when employed in a wellbore. Inconsistent results may be further mitigated with the use of metakaolin because the mineral phases of metakaolin, and other aluminosilicates, are stable at high temperature. Whereas Portland cement mineral phases at temperatures greater than about 230° F. may display strength retrogression.

Furthermore, the settable fluids provided herein may be produced at variable densities and may be compatible with known foaming agents, fluid loss control agents, and other common additives. The cementitious blends and settable fluids may also have strength and pumping characteristics similar to that of Portland cement compositions. Therefore, the cementitious blends and settable fluids of the present invention may be available for easy and cost effective integration into existing wellbore operations and methods.

It should be noted that when "about" is provided at the beginning of a numerical list, "about" modifies each number of the numerical list. In addition, in some numerical listings of ranges, some lower limits listed may be greater than some upper limits listed. One skilled in the art will recognize that the selected subset will require the selection of an upper limit in excess of the selected lower limit. Whenever a range of values is given, any subset of that range (between the highest and lowest point) is an acceptable alternative range in the embodiments of the present invention.

In some embodiments, a cementitious blend of the present invention may comprise metakaolin particulates and aluminosilicate particulates. It should be understood that the term "particulate" or "particle," as used in this disclosure, includes all known shapes of materials, including, but not limited to, spherical materials, substantially spherical materials, low to high aspect ratio materials, fibrous materials, polygonal materials (such as cubic materials), and mixtures thereof. Generally, metakaolin is a white pozzolana that may be prepared by heating kaolin clay, for example, to temperatures in the range from 500° C. to about 900° C. In some embodiments, metakaolin particulates may comprise high-reactive metakaolin. Generally, high-reactive metakaolin is metakaolin that had been processed to temperatures in excess of 650° C. In some embodiments, metakaolin may be present in the cementitious blend in a concentration ranging from a lower limit of about 5%, 10%, 15%, 25%, or 50% by weight of settable blend to an upper limit of about 85%, 75%, 65%, or 50% by weight of cementitious blend, and wherein the concentration may range from any lower limit to any upper limit and encompass any subset between the upper and lower limits.

Suitable aluminosilicate particulates may be any known pozzolans comprised of aluminum oxides and silicon oxides. Examples of aluminosilicate particulates include, but are not limited to, fly ash including Class F and Class C; cement kiln dust; biowaste ash; zeolite; slag cement; shale particulates; pumice (including pumicite); and any combination thereof. Suitable examples of fly ash include, but are not limited to, POZMIX®A (cement additive, available from Halliburton Energy Services, Inc., Duncan, Okla.) and Micro Fly Ash® (cement additive, available from Halliburton Energy Services, Inc., Duncan, Okla.). In some embodiments, aluminosilicate may be present in the settable blend in a concentration ranging from a lower limit of about 15%, 25%, 35%, 50%, or 60% by weight of cementitious blend to an upper limit of about 95%, 85%, 75%, 65%, or 50% by weight of cementitious blend, and wherein the concentration may range from any lower limit to any upper limit and encompass any subset between the upper and lower limits.

In some embodiments, a cementitious blend of the present invention may be essentially Portland cement free. As used herein, the term "essentially free" should be taken to mean less than about 1% by weight of cementitious blend. In some embodiments, the cementitious blend may contain Portland cement in an amount less than about 0.1%, 0.05%, or 0.01% by weight of cementitious blend. By way of nonlimiting example, the cementitious blend may be free of Portland cement, i.e., the cementitious blend contains no Portland cement. Suitable Portland cements may include, but are not limited to, those classified as American Petroleum Institute Classes A, C, G, and H; ASTM Type I, II, and III; and any combination thereof.

In some embodiments, a settable fluid of the present invention may comprise a cementitious blend, an aqueous-based medium, and a lime composition. As used herein, the term "settable fluid" should be taken to mean a composition that over time sets to form a hardened mass. Suitable aqueous-based medium for use in the present invention may comprise fresh water, saltwater (e.g., water containing one or more salts dissolved therein), brine (e.g., saturated salt water), seawater, and any combination thereof. Generally, the water may be from any source, provided that it does not contain components that might adversely affect the stability and/or performance of the compositions or methods of the present invention. In some embodiments, an aqueous-based medium may comprise a salt. Suitable salts may be any mono- or multivalent salts including, but not limited to, sodium salts, potassium salts, magnesium salts, calcium salts, chloride salts, bromide salts, sulfate salts, carbonate salts, phosphate salts, and any combination thereof. In some embodiments, salts may be present in an aqueous-based medium in concentration up to its saturated concentration limit at bottom hole pressure and temperature, for example, about 37% by weight of water at ambient conditions.

As used hereinafter, the term "lime composition" should be taken to mean a composition comprising alkali metal oxides such as calcium oxide, calcium hydroxide, magnesium oxide, or any combination thereof. In some embodiments, the lime composition may comprise hydrated lime. In some embodiments, a lime composition may be present in a settable fluid in an amount ranging from a lower limit of about 5%, 10%, 15%, or 25% to an upper limit of about 50%, 40%, 30%, 25%, or 15% by weight of cementitious blend, and wherein the concentration may range from any lower limit to any upper limit and encompass any subset between the upper and lower limits.

In some embodiments, a settable fluid of the present invention is introduced into a wellbore and/or a subterranean formation and allowed to set therein. Suitable subterranean formations include all subterranean formations including, but not limited to, formations containing corrosive components; low-temperature formations, i.e., about 30° F. to about 80° F. bottom hole circulating temperature; formations with a salt dome, sheet, pillar, or other structure; evaporite formations; unconsolidated formations; shale formations; and any combination thereof. Corrosive components may include, but not be limited to, acids including carbonic acid, hydrochloric acid, hydrofluoric acid, acetic acid, sulfuric acid, formic acid, and the like; dissolved carbon dioxide; salts including mono- and multivalent salts, e.g., sodium chloride and magnesium chloride; sulfur containing compounds including hydrogen sulfide, sulfuric acid, and sulfur; microorganisms and their byproducts; and any combination thereof. By way of nonlimiting example, a settable fluid may be introduced into a wellbore penetrating a subterranean formation with a salt dome and high levels of carbonic acid. The cementitious blends and settable fluids provided herein may be particularly well-suited for use in corrosive formations. By way of nonlimiting example, the Sing a formation in Indonesia, which comprises about 30% $CO_2$ and 11% $H_2S$, may be well-suited for the cementitious blends and settable fluids provided herein.

Figure 2:
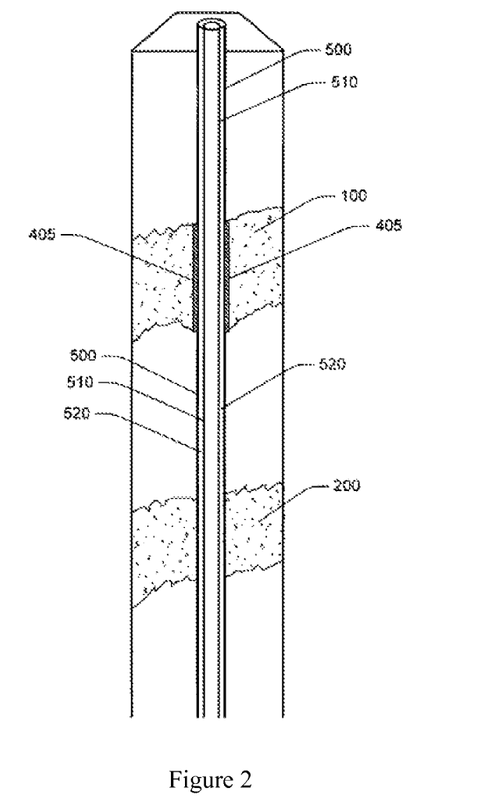
FIG. 2 depicts a cross-section of a wellbore penetrating a subterranean formation, within which reside two hydrocarbon-bearing zones.

In some embodiments, a settable fluid may be used for primary cementing operations or remedial cementing operations. By way of nonlimiting example of primary cementing, a settable fluid may be introduced into an annulus between a pipe string located in a subterranean formation and the subterranean formation and then allowed to set therein. By way of nonlimiting example of remedial cementing, a settable fluid may be used in squeeze cementing operations or in the placement of cement plugs. Additional examples may include using a settable fluid to plug a void or crack in a conduit in a wellbore; to plug a void or crack in a cement sheath disposed in an annulus of the wellbore; to plug an opening between the cement sheath and a conduit; to prevent the loss of aqueous or non-aqueous drilling fluids into loss circulation zones such as a void, vugular zone, or fracture; to be used as a fluid in front of cement slurry in cementing operations; to seal an annulus between the wellbore and an expandable pipe or pipe string; or combinations thereof. FIG. 2 illustrates a nonlimiting example of using a settable fluid described herein to provide lost circulation control in a partially unconsolidated subterranean formation. FIG. 2 illustrates a wellbore 500 and a casing 510 with an annulus 520 therebetween that penetrates as subterranean formation with hydrocarbon-bearing zones 100 and 200, wherein hydrocarbon-bearing zone 100 is an unconsolidated zone. Zonal isolation of the unconsolidated hydrocarbon-bearing zone 100 is provided by a set composition 405 produced from a settable fluid provided herein.

In some embodiments, the settable fluid may be included in another treatment fluid including, but not limited to, a spotting fluid, a flush fluid, a spacer fluid, a cement slurry, a squeeze fluid, a drilling fluid, and a consolidation fluid. In some embodiments, the settable fluid may be foamed.

In some embodiments, the settable fluid of the present invention may be used in conjunction with specific wellbore operations including, but not limited to, casing operations, plugging operations, drilling operations, lost circulation operations, filter cake operations, sand control operations, fracturing operations, completion operations, water-blocking operations, clay stabilizer operations, and wellbore strengthening operations. The methods and compositions of the present invention may be used in full-scale operations or pills. As used herein, a "pill" is a type of relatively small volume of specially prepared treatment fluid placed or circulated in the wellbore.

In some embodiments, a settable fluid of the present invention may be introduced into a wellbore that has a cementitious composition already present therein. In some embodiments, a settable fluid of the present invention may be used in remedial operations to strengthen an existing cementitious composition within a wellbore and/or subterranean formation.

Based on the wellbore operation and other factors, one skilled in the art would understand additives that may be added to a settable fluid including, but not limited to, set retarders, set accelerators, viscosifiers, gases, surfactants, fluid loss control additives, suspending aids, mechanical properties modifiers, density modifiers, gas migration control aids, and any combination thereof. One skilled in the art would understand the plurality of available additive that may be added to a settable fluid and in what concentrations to achieve a desired fluid property.

Suitable set retarders may be any known set retarder applicable in subterranean formations including, but not limited to, HR-5® (sodium salt of lignosulfonate, available from Halliburton Energy Services, Inc., Duncan, Okla.), HR-6L® (lignosulfonate retarder, available from Halliburton Energy Services, Inc., Duncan, Okla.), HR-25® (tartaric acid, available from Halliburton Energy Services, Inc., Duncan, Okla.), HR-15® (mixture of lignosulfonate and tartaric acid, available from Halliburton Energy Services, Inc., Duncan, Okla.), HR-800® (non-lignin cement retarder, available from Halliburton Energy Services, Inc., Duncan, Okla.), HR-817® (non-lignin cement, high-temperature retarder, available from Halliburton Energy Services, Inc., Duncan, Okla.), SCR-100® (a copolymer of 2-acrylamide-2-methylpropane sulfonic acid and acrylic acid, available from Halliburton Energy Services, Inc., Duncan, Okla.), FDP 601™ (lignosulfonate retarder, available from Halliburton Energy Services, Inc., Duncan, Okla.), SCR-500™ (a copolymer of 2-acrylamido-2-methylpropane sulfonic acid and itaconic acid, available from Halliburton Energy Services, Inc., Duncan, Okla.) and any combination thereof. Set retarders may be included in a settable fluid in a concentration ranging from a lower limit of about 0.05%, 0.1%, 0.25%, 0.5%, 1%, 2%, or 3% to an upper limit of about 10%, 5%, 3%, 2%, 1%, or 0.5% by weight of cementitious blend, and wherein the concentration may range from any lower limit to any upper limit and encompass any subset between the upper and lower limits. By way of nonlimiting example, a settable fluid with the addition of a retarder in sufficient quantity, e.g., about 2% to about 15%, may be used as a drilling fluid. As such, the retarder may provide for the fluid to not set for at least 7 days, 4 days, 72 hours, or 48 hours after introduction into the wellbore.

Figure 1:
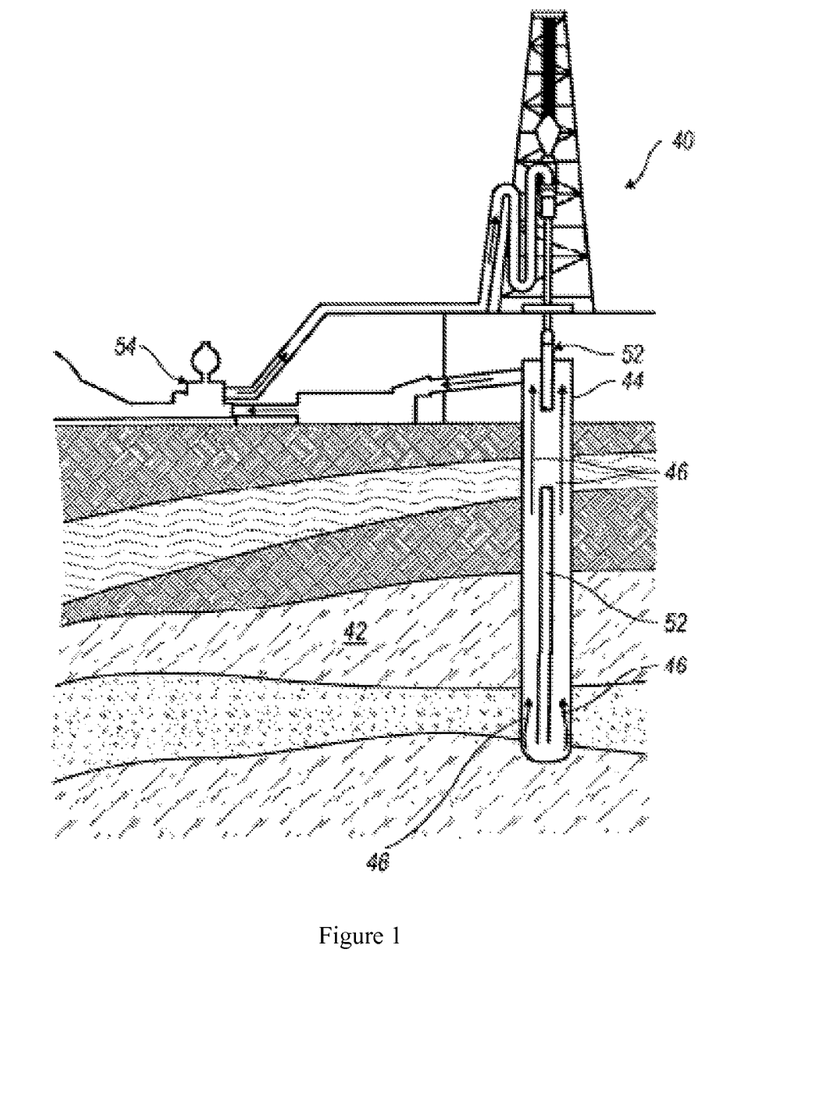
FIG. 1 depicts a cross-section of a drill rig and a wellbore for recovering oil or gas from a subterranean formation penetrated by the wellbore.

FIG. 1 illustrates a nonlimiting example of using a settable fluid comprising a set retarder described herein. An oil rig 40 may be positioned near the surface of the earth 42 for later recovering oil from a subterranean formation (not shown). A wellbore 44 may be drilled in the earth such that it penetrates the subterranean formation. A pipe 52, e.g., a casing, may extend down through wellbore 44 for delivering fluid to and/or from the wellbore. In a primary cementing process, the settable fluid may be pumped down through pipe 52 and up through the annulus of wellbore 44 as indicated by arrows 46 using one or more pumps 54. The settable fluid may be allowed to set within the annulus, thereby sealing wellbore 44. Due to the presence of the set retarder in the settable fluid, the thickening time is desirably sufficient to allow the settable fluid to be pumped into the annulus such that it substantially fills the annulus before setting. Any secondary cementing operations known in the art may also be performed using the cement composition. For example, a squeeze cementing technique may be employed to plug permeable areas or voids in the cement sheath or the pipe 52. Again, the thickening time of the cement composition is sufficient to ensure that the cement composition remains pumpable until it has been placed in its desired location.

Suitable set accelerators may be any known set accelerator applicable in subterranean formations including, but not limited to, calcium hydroxide, sodium hydroxide, sodium sulfate, sodium carbonate, sodium silicate, nanomaterials, and any combination thereof. Set accelerators may be included in a settable fluid in a concentration ranging from a lower limit of about 0.01%, 0.05%, 0.1%, 0.25%, 0.5%, 1%, 2%, or 3% to an upper limit of about 15%, 10%, 5%, 3%, 2%, 1%, or 0.5% by weight of cementitious blend, and wherein the concentration may range from any lower limit to any upper limit and encompass any subset between the upper and lower limits. By way of nonlimiting example, a settable fluid with the addition of an accelerator in sufficient quantity, e.g., about 0.02% to about 15%, may be used as a drilling fluid.

Suitable fluid loss control agents may be any known fluid loss control agent applicable in subterranean formations including, but not limited to, HALAD®-413 (causticized lignite grafted with 2-acrylamido-2-methylpropane sulfonic acid, N,N-dimethylformamide and acrylonitrile, available from Halliburton Energy Services, Inc., Duncan, Okla.), HALAD®-344 (a copolymer of N,N-dimethylformamide and 2-acrylamido-2-methylpropane sulfonic acid, available from Halliburton Energy Services, Inc., Duncan, Okla.), HALAD®-862 (cement additive, available from Halliburton Energy Services, Inc., Duncan, Okla.), HALAD®-567 (synthetic polymer, available from Halliburton Energy Services, Inc., Duncan, Okla.), carboxy methyl hydroxyethyl cellulose, acrylomorpholine and vinyl phosphonic acid, 2-acrylamido-2-methylpropane sulfonic acid (AMPS), and any combination thereof. One skilled in the art would understand the plurality of other components and additives that may also function to some degree as fluid loss control agents including, but not limited to, fillers or extenders such as gilsonite, diatomaceous earth, ground coal, sand, and the like. Fluid loss control agents may optionally be included in a settable fluid in a concentration ranging from a lower limit of about 0.05%, 0.1%, 0.25%, 0.5%, 1%, 5%, or 10% to an upper limit of about 25%, 15%, 10%, 5%, or 1% by weight of cementitious blend, and wherein the concentration may range from any lower limit to any upper limit and encompass any subset between the upper and lower limits.

In some embodiments, a settable fluid of the present invention may comprise a density modifier to assist in achieving a high-density fluid, i.e., greater than about 13.5 pounds per gallon (ppg), or a low-density fluid, i.e., less than about 13.5 pounds per gallon (ppg). Suitable high-density modifiers may be any known high-density modifier including, but not limited to, MICROMAX® (ground hausmannite ore, available from Halliburton Energy Services, Inc., Duncan, Okla.), barite, HI-DENSE® #3&4 (hematite ore, available from Halliburton Energy Services, Inc., Duncan, Okla.), and any combination thereof. Suitable low-density modifiers may be any known low-density modifier including, but not limited to, hollow glass beads, foaming by a gas, elastomers, perlites, cenospheres, hollow polymeric beads, and any combination thereof. One skilled in the art would understand the concentration of a density modifier to add to a settable fluid to achieve a desired density.

In some embodiments, a settable fluid may comprise a cementitious composition that thickens in greater than about 3 hours as measured by high-temperature and high-pressure consistometer at a desired bottom hole circulating temperature within the range of about 30° F. to about 650° F. In some embodiments, a settable fluid may comprise an additive such that the settable fluid thickens in greater than about 3 hours as measured by high-temperature and high-pressure consistometer at a desired bottom hole circulating temperature within the range of about 80° F. to about 650° F. As used herein, the "thickening time" refers to the time required for the cement composition to achieve 70 Bearden units of Consistency (Bc), as described in API Recommended Practice for Testing Well Cements 10B, 23rd edition, April 2002. At about 70 Bc, the slurry undergoes a conversion from a pumpable fluid state to a non-pumpable paste. In some embodiments, the settable fluid with or without an additive may have a thickening time from a lower limit of about 3 hours, 6 hours, 12 hours, 24 hours, 48 hours, 72 hours, or 5 days to an upper limit of about 2 weeks, 1 week, 5 days, or 72 hours, and wherein the thickening time may range from any lower limit to any upper limit and encompass any subset between the upper and lower limits. In some embodiments, the settable fluid with or without an additive may remain pumpable, i.e., not thicken, for about 3 hours after introduction into the wellbore.

Suitable bottom hole circulating temperatures (BHCT) of a wellbore and/or subterranean formation may be any BHCT suitable for the use of a predominantly Portland cement composition. One skilled in the art would understand the necessary additives, concentrations, and/or processing adjustments needed for using a cementitious blend of the present invention with a given BHCT. Generally, the BHCT may range from a lower limit of about 30° F., 100° F., 150° F., 200° F., or 250° F. to an upper limit of about 650° F., 600° F., 550° F., 500° F., 450° F., 400° F., 350° F., 300° F., 250° F., 200° F., 150° F., or 100° F., and wherein the concentration may range from any lower limit to any upper limit and encompass any subset between the upper and lower limits.

In some embodiments, a method comprises providing a settable fluid that comprises an aqueous-based medium, a lime composition, and a cementitious blend that comprises metakaolin particulates and aluminosilicate particulates, wherein the cementitious blend is essentially free of Portland cement; introducing the settable fluid into a wellbore penetrating a subterranean formation that comprises a corrosive component; and allowing the settable fluid to set therein.

In some embodiments, a method comprises providing a drilling fluid that comprises an aqueous-based medium, a lime composition, a set retarder, and a cementitious blend that comprises metakaolin particulates and aluminosilicate particulates, wherein the drilling fluid is essentially free of Portland cement, and wherein the set retarder is greater than about 2% by weight of settable blend; and drilling at least a portion of a wellbore penetrating a subterranean formation with the drilling fluid.

In some embodiments, a settable fluid comprises an aqueous-based medium; a settable blend comprising metakaolin particulates at a concentration of about 5% to about 85% by weight of the settable blend and a fly ash at a concentration of about 15% to about 95% by weight of the settable blend; and a lime composition at a concentration of about 5% to about 25% by weight of the settable blend, wherein the settable fluid does not include a Portland cement.

To facilitate a better understanding of the present invention, the following examples of preferred embodiments are given. In no way should the following examples be read to limit, or to define, the scope of the invention.

EXAMPLES

Settable Fluids Tested.

Table 1 below provides density and composition data for five settable fluid slurries comprising cementitious blends of the present invention and one slurry of Portland cement for comparison. The cementitious blends contain POZMIX® A and metakaolin. All other components of the slurry were added at concentration measured in percent by weight cementitious blend (% bwc) unless otherwise specified.

TABLE 1

| | Settable Fluids Tested | | | | | |
|---|---|---|---|---|---|---|
| | Sample 1 | Sample 2 | Sample 3 | Sample 4 | Sample 5 | Comparative Sample 6 |
| Density (lb/gal) | 14 | 13.5 | 13.5 | 13.5 | 15.8 | 13.5 |
| Composition | 0 | 0 | 0 | 0 | 0 | 100 |
| Portland cement G (% bwc) | 0 | 0 | 0 | 0 | 0 | 100 |
| POZMIX ® A (% bwc) | 60 | 60 | 60 | 60 | 65 | 0 |

TABLE 1-continued

| | Settable Fluids Tested | | | | | |
|---|---|---|---|---|---|---|
| | Sample 1 | Sample 2 | Sample 3 | Sample 4 | Sample 5 | Comparative Sample 6 |
| Metakaolin (% bwc) | 40 | 40 | 40 | 40 | 35 | 0 |
| hydrated lime (% bwc) | 15 | 15 | 15 | 15 | 15 | 0 |
| Hi Dense ® #3 (% bwc) | 0 | 0 | 0 | 0 | 45 | 0 |
| FDP-C930-09 (% bwc) | 0 | 0 | 0 | 0 | 10 | 0 |
| sodium sulfate (% bwc) | 2 | 0 | 2 | 0 | 2 | 0 |
| Viscosifier (% bwc) | 0 | 0 | 0 | 0 | 0 | 0.5 |
| HALAD ®-413 (% bwc) | 0 | 1.5 | 1 | 1 | 1 | 1.1 |
| COATEX ® SP (% bwc) | 1.4 | 1.4 | 1.4 | 1.4 | 1.4 | 0 |
| HR ®-6L (% bwc) | 0 | 0 | 0 | 0 | 0 | 0.05 gal/sk |
| Water (% bwc) | 55 | 63 | 63 | 63 | 61 | 63 |

Compressive Strength Development.

Ultrasonic cement analyzer (UCA) was used to monitor compressive strength development on each slurry. About 120 mL of a slurry was added to the sample container. The slurry was heated to 200° F. at 3000 psi while monitoring the compressive strength and acoustic transient time (a measure of apparent strength, i.e., shorter transient times indicate higher strength). An ultrasonic cement analyzer ("UCA") available from FANN Instrument Company, UCA autoclave (controller model 304) was used to determine the compressive strength of the slurries after twenty-four hours. The UCA tests were performed in accordance with API Recommended Practice 10B-2 (ISO 10426-2), First edition, July, 2005, "Recommended Practice for Testing Well Cements." Compressive strength predicted my UCA was calibrated to obtain a real compressive strength after evaluating and calibrating with the UCA cured sample using Tenious Olsen device, as shown below in Table 2.

TABLE 2

| | Compressive Strength Development at 200° F. and 3000 psi | | | | | |
|---|---|---|---|---|---|---|
| | Sample 1 | Sample 2 | Sample 3 | Sample 4 | Sample 5 | Comparative Sample 6 |
| 5 hours | 1713 | 0 | 687 | 387 | 697 | 0 |
| 10 hours | 1800 | 735 | 922 | 521 | 1251 | 0 |
| 24 hours | 2146 | 873 | 1019 | 589 | 1450 | 950 |
| 48 hours | 2374 | 1011 | 1214 | 656 | 1626 | 1118 |

The settable fluids display the expected response in changes to the composition. For example, the addition of the accelerator (2% $Na_2SO_4$) in Sample #3 relative to Sample #4 speeds the setting process as expected thereby reaching higher compressive strengths sooner. Additionally, a cementitious blend of the present invention can be optimally accelerated (Sample #3) to achieve comparable compressive strengths to a Portland cement composition (Comparative Sample #6).

Comparison between Sample #3 and Comparative Sample #6, demonstrate, once accelerated (i.e., properly optimized), the settable composition of the present invention exhibits comparable compressive strength after 48 hrs to a Portland cement.

Thickening Retardation.

Sample #2 was further altered with different retardant compositions and concentrations, as shown in Table 3 below. The thickening time was measured in accordance with API Recommended Practice 10B-2. As used herein, "thickening time" refers to the time required for the cement composition to achieve 70 Bearden units of Consistency (Bc), as described in API Recommended Practice for Testing Well Cements 10B, 23rd edition, April 2002. At about 70 Bc, the slurry undergoes a conversion from a pumpable fluid state to a non-pumpable paste. As demonstrated, the cementitious blends of the present invention may be used with a variety of set retarders at varying concentrations to achieve a desired thickening time. For standard cementing operations it may be desirable to have thickening times of greater than about 3 hours. One skilled in the art would understand the utility of adjusting the thickening time of a settable fluid.

TABLE 3

Retarding Thickening Time

| Retarder #1 | Retarder #2 | Thickening Time (hh:mm) |
| --- | --- | --- |
| HR ®-15 (0.5% bwc) | n/a | 1:20 |
| HR ®-15 (0.75% bwc) | n/a | 3:24 |
| HR ®-15 (1% bwc) | n/a | 9:22 |
| HR ®-800 (1% bwc) | n/a | 0:35 |
| SCR ®-100 (1% bwc) | n/a | 0:45 |
| SCR ®-100 (0.67% bwc) | HR ®-25 (0.33% bwc) | 3:24 |
| HR ®-5 (0.67% bwc) | HR ®-25 (0.33% bwc) | 9:22 |
| HR ®-5 (1% bwc) | n/a | 3:40 |
| HR ®-817 (1% bwc) | n/a | 0:35 |
| HR ®-25 (0.33% bwc) | n/a | 1:25 |
| HR ®-25 (1% bwc) | n/a | 8:33 |
| HR ®-25 (0.75% bwc) | Gel modifier (0.2 gal/sk) | 9:25 |
| HR ®-25 (0.5% bwc) | Gel modifier (0.2 gal/sk) | 7:30 |

Compatibility with Salts Containing $MgCl_2$.

Sample #2 with 1% bwc HR®-15 retarder was conditioned at 190° F. using an atmospheric consistometer for two hours. Rheology values were taken immediately after conditioning. Then 3% bwc salt ($MgCl_2.6H_2O$:KCl:NaCl of 0.71:0.26:0.03) was mixed with the conditioned Example #2 using a blender followed by 10 minutes further conditioning in the atmospheric consistometer at 190° F. Rheology values provided below were taken with a Fann Model 35. As used herein, the "viscosity" is measured according to API RP 10B-2/ISO 10426-2 as follows. The material to be tested, such as a liquid concentrate, is prepared. The material is placed into the test cell of a rotational viscometer, such as a Fann Model 35. Viscosity can be calculated using the following equation, expressed in units of centipoise:

$$V = \frac{k_1 k_2}{k_3}(100)\frac{\theta}{N}$$

where $k_1$ is the torsion constant in dyne*cm/degree deflection; $k_2$ is the shear stress constant in $cm^3$; (100) is the conversion constant from Poise to centipoise; $\theta$ is the dial reading on the viscometer; $k_3$ is the shear rate constant in 1/sec per revolutions per minute (rpm); and N is the rpm.

Viscosity after addition of salt increases, but the settable fluid remains pumpable as measured by atmospheric consistometer. Before salt addition, the settable fluid displayed a consistency of 10 Bc. After salt addition, the consistency of the settable fluid increased to 15 Bc which is well below the 70 Bc threshold below which a fluid is pumpable. The results are shown in Table 4, below.

TABLE 4

Rheology of Settable Fluids with Carnalite Contamination

| before salt addition | | after salt addition | |
| --- | --- | --- | --- |
| RPM | Fann 35 reading | RPM | Fann 35 reading |
| 300 | 84 | 300 | 114 |
| 200 | 62 | 200 | 88 |
| 100 | 44 | 100 | 76 |
| 6 | 18 | 6 | 40 |
| 3 | 16 | 3 | 34 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method of cementing, the method comprising:
   providing a settable fluid that comprises an aqueous-based medium, a lime composition, and a cementitious blend that comprises metakaolin particulates and aluminosilicate particulates, wherein the cementitious blend does not comprise cement kiln dust, and
   wherein the cementitious blend is essentially free of Portland cement;
   introducing the settable fluid into a wellbore penetrating a subterranean formation that comprises a corrosive component; and
   allowing the settable fluid to set therein.

2. The method of claim 1, wherein the corrosive component is selected from the group consisting of an acid; dissolved carbon dioxide; a monovalent salt; a multivalent salt; a sulfur containing compound; a microorganism and a byproduct thereof; and any combination thereof.

3. The method of claim 1, wherein the settable fluid further comprises an additive selected from the group consisting of a set retarder, a set accelerator, a viscosifier, a gas, a surfactant, a fluid loss control additive, a suspending aid, a mechanical properties modifier, a density modifier, a gas migration control aid, and any combination thereof.

4. The method of claim 1, wherein the metakaolin particulates comprise high-reactive metakaolin particulates.

5. The method of claim 1, wherein the metakaolin particulates are present in the settable fluid at about 5% to about 85% by weight of total cementitious blend.

6. The method of claim 1, wherein at least some of the aluminosilicate particulates are selected from the group consisting of a Class F fly ash particulate, a Class C fly ash particulate, a biowaste ash particulate, a zeolite particulate, a slag particulate, and any combination thereof.

7. The method of claim 1, wherein the aluminosilicate particulates are present in the settable fluid at about 15% to about 95% by weight of total cementitious blend.

8. The method of claim 1, wherein the lime composition is present in the settable fluid in an amount of about 5% to about 50% by weight of total cementitious blend.

9. The method of claim 1, wherein the settable fluid is foamed.

10. The method of claim 1, wherein the settable fluid is included in a treatment fluid selected from the group consisting of a spotting fluid, a flush fluid, a spacer fluid, a cement slurry, a squeeze fluid, a drilling fluid, and a consolidation fluid.

11. The method of claim 1, wherein the subterranean formation includes a cementitious composition that was placed therein prior to introducing the settable fluid into the wellbore.

12. The method of claim 1, wherein the subterranean formation has a bottom-hole temperature of about 30° F. to about 230° F.

13. The method of claim 1, wherein the settable fluid has a thickening time of about 3 hours to about 5 days as measured by high-temperature and high-pressure consistometer at a desired bottom hole circulating temperature within the range of about 80° F. to about 650° F.

14. The method of claim 1, wherein the settable fluid has a density greater than about 13.5 pounds per gallon.

15. The method of claim 1, wherein the settable fluid has a density less than about 13.5 pounds per gallon.

16. A method comprising:
providing a drilling fluid that comprises an aqueous-based medium, a lime composition, a set retarder, and a cementitious blend that comprises metakaolin particulates and aluminosilicate particulates,
wherein the cementitious blend does not comprise cement kiln dust,
wherein the drilling fluid is essentially free of Portland cement, and
wherein the set retarder is present at about 2% to about 15% by weight of cementitious blend; and
drilling at least a portion of a wellbore penetrating a subterranean formation with the drilling fluid.

17. The method of claim 16, wherein the drilling fluid does not set for at least about 72 hours after introduction into the wellbore.

18. The method of claim 16, wherein the drilling fluid further comprises an additive selected from the group consisting of a set retarder, a set accelerator, a viscosifier, a gas, a surfactant, a fluid loss control additive, a suspending aid, a mechanical properties modifier, a density modifier, a gas migration control aid, and any combination thereof.

19. The method of claim 16 wherein the portion of the wellbore being drilled contains a corrosive component selected from the group consisting of carbonic acid; dissolved carbon dioxide; a monovalent salt; a multivalent salt; sulfur containing compounds; and any combination thereof.

20. A settable fluid comprising:
an aqueous-based medium;
a cementitious blend comprising:
metakaolin particulates at a concentration of about 5% to about 85% by weight of the cementitious blend and a fly ash at a concentration of about 15% to about 95% by weight of the cementitious blend; and
a lime composition at a concentration of about 5% to about 25% by weight of the cementitious blend,
wherein the settable fluid does not include a Portland cement, cement kiln dust, or pumice.

* * * * *